Patented Aug. 22, 1939

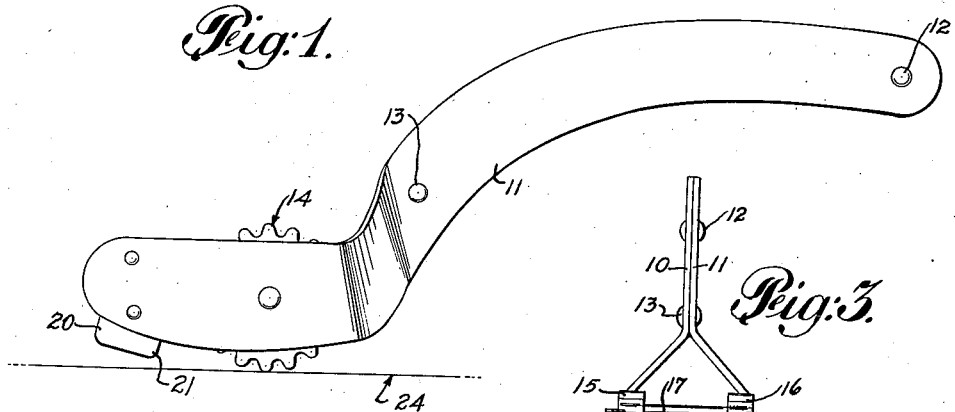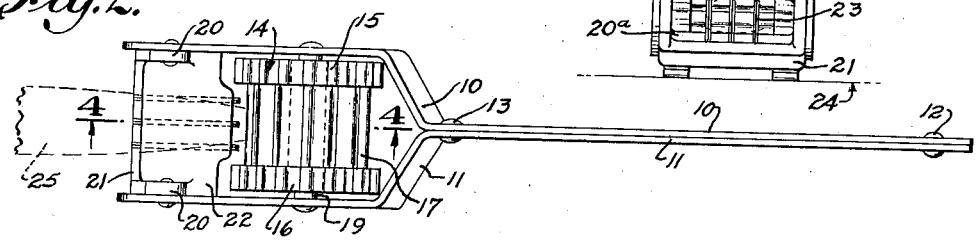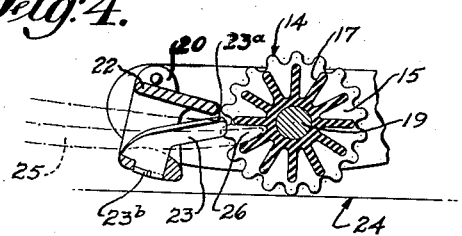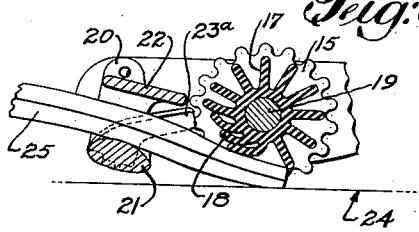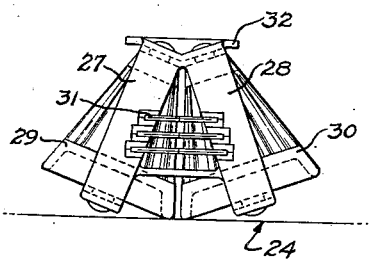

2,170,536

UNITED STATES PATENT OFFICE 2,170,536

VEGETABLE SLICING AND STRINGING TOOL

Kuno W. Mesterton, Brooklyn, N. Y.

Application May 18, 1937, Serial No. 143,292

6 Claims. (Cl. 146—171)

This invention relates to improvements in a vegetable slicing and stringing tool for use with any vegetable, but more particularly adapted to slice and string beans, and has for its object the provision of a tool of simple construction having few parts and having the advantages hereinafter set forth.

By way of illustration, two embodiments of the invention are disclosed in the following specification, and in the accompanying drawing Figure 1 is a vertical plan view of the tool embodying the invention;

Figure 2 is a top view of the tool, Figure 1;

Figure 3 is an end view of the tool, Figure 1;

Figure 4 is a sectional view on the line 4—4 of Figure 2 with a string bean shown in dotted lines;

Figure 5 is a sectional view similar to Figure 4 but with the string bean projecting all the way into the roller and engaged thereby; and Figure 6 is an end view of a modified form of the tool shown in Figure 1.

The tool has a forked-shape frame which may be formed of the side members 10 and 11, shaped as shown in Figures 1 and 2, which are held together by any suitable means such as the rivets 12, 13 or they may be spot welded together. Between the ends of the fork is supported a roller generally denoted by the numeral 14 comprised of the side members 15, 16 which may be made of any suitable material, preferably a tough rubber similar to the tread of an automobile tire. These side members are corrugated so that they will firmly grip the surface over which they are rolled.

A center portion 17 of the roller is comprised of a plurality of radially extending fingers or flanges which extend across the roller between the sides thereof and this center portion is made of suitable material such as rubber somewhat softer than the sides, so that the flanges will engage the bean and bend downwardly thereon, as shown at 18, Figure 5, when the device is in operation. The portion 17 may be separate from the side members 15, 16 so that the flanges thereon will bend when engaging the bean in the manner just described so that the roller will roll over the bean without raising the side members 15, 16 off the surface 24 along which the tool is pushed with a slight pressing motion, and draw the same through the knives 23 to be presently described.

The sides 15, 16 and the center portion 17 are mounted upon a shaft 19 supported in the sides of the frame.

Immediately ahead of the roller 14 and secured to the open end of the forked frame in any suitable manner is a knife carrier 20 having a bottom portion 21 and a guide portion 22, said bottom and guide portions being formed integral with the carrier. Suitably secured in the bottom portion and extending upwardly and inwardly therefrom is a plurality of knives 23 disposed across the front of the knife carrier between the bottom and guide portions thereof as shown in the drawing. The knives slant inwardly and upwardly in the throat of the carrier as shown so that, as the vegetable is drawn thereagainst by the action of roller 14, the vegetable is drawn through the throat of the carrier without undue pressure on the guide 22 or bottom 21 thereof which occurs if the knives are vertical in the throat 20a.

If desired, the upper ends 23a of the knives can be secured in the top 20a of the carrier in the same manner as the bottom 23b thereof, as shown in Figure 4.

In use, the device is pushed along any suitable surface 24 which action rotates the roller 14. The bean 25 thrust into the opening in the knife carrier 20 will first engage the center portion 17 of the roller 14 and will enter between the flanges thereof as indicated at 26, Figure 4. As the roller revolves, the bean will be pressed downwardly until in contact with the surface 24 as shown in Figure 5, and during this operation the flanges on the center portion 17 of the roller will fold over the top of the bean as shown at 18 and will grip the same and urge the bean inwardly so that the bean will be drawn through the knives 23. The two outermost knives are arranged so that they will string the bean and one or more center knives will slit the same longitudinally.

In the modification shown in Figure 6, a single piece of sheet metal as shown at 32, forms the frame, and this is provided with two downwardly and inwardly extending ears which are bent over as shown at 27 and 28. A pair of rollers 29 and 30 are mounted in these ears and the construction of these rollers is in all respects identical (except that they are conical) with the roller 14. Suitable knives 31 are mounted in the ears. These knives may be straight across the ears or may be V-shaped, with the V pointing inwardly.

This type of device in operation is pushed along a surface, same as the device shown in Figure 1, and the bean is inserted frontwise. It is gripped by the rollers, the action of same being the same as that described in connection with Figure 5, except that there being two rollers, they cooperate to clutch the bean and draw it through the knives.

It will be seen from Figure 6 that only the lower edges of the rollers 29 and 30 engage the surface 24 over which the device is pushed to cause it to operate.

If desirable the knives may be inserted in either form of the device in such a way that they are readily removable therefrom, either individually or as a unit. For example, the knife carrier 20 can be secured to the frame by means of screws instead of rivets, as shown.

It will be observed from a study of the foregoing disclosures that the device is simple in construction, positive in operation, that it is easily cleaned, and that all parts are open for inspection at all times.

What is claimed is:

1. A tool of the character described comprising a frame, a roller supported therein and extending below said frame to permit said roller to engage and roll over a surface when said device is pushed therealong, a plurality of knives mounted ahead of said roller and having their edges perpendicular to the axis thereof adapted to slice a vegetable when the same is drawn therethrough and the portion being cut is out of contact with the surface on which the tool is rolled, and resilient means on said roller adapted to engage said vegetable and draw the same through said knives while passing over the sliced vegetable while same is held between said means and the surface engaged by said roller.

2. In a tool of the character described, a frame, a knife carrier mounted on said frame having a longitudinal throat having a rounded inner bottom wall and a flat upper wall sloping downwardly in said throat, and a plurality of knives positioned in said throat and having their cutting edges extending upwardly from the bottom of the throat towards the slanting top wall thereof, and means on said frame for drawing a vegetable through said throat and past said knives to slice the vegetable thereby.

3. In a tool of the character described, in combination, a frame, a roller pivotally supported therein and having end portions below the bottom of said frame and adapted to engage and roll along a surface as the tool is propelled thereover, means forming a throat in said frame, said roller also including a portion between its ends adapted to engage a vegetable extending through said throat and hold the same against said surface, thereby causing said vegetable to traverse said throat as said tool is propeller over said surface, and cutting means supported within said throat for slicing said vegetable as the latter is pulled through said throat by said roller.

4. In a tool of the character described, a frame having a throat formed therein, a resilient roller in said frame adjacent to said throat and having portions extending beneath said frame adapted to engage and compress a vegetable between said roller and a surface over which said tool is moved, thereby drawing said vegetable through said throat, a pivot shaft mounted in said frame and supporting said roller, and a plurality of knives within said throat, the axes of said knives being angular with respect to the shaft.

5. In a tool of the character described, a frame, a pair of rollers pivotally mounted in said frame and extending below said frame to engage a surface as said tool is propelled therealong, a feed roller supported between the rollers of said pair and comprised of a plurality of radially extending webs of resilient material adapted to successively engage a vegetable and to hold the same against said surface as the tool is propelled therealong, a throat in said frame, and a plurality of knives positioned in said throat and adapted to slice said vegetable as it is drawn through said throat due to the action of said feed roller cooperating with said surface.

6. In a tool of the class described, a frame carrying a throat through which vegetables may be drawn, a plurality of knives positioned in said throat and having their cutting edges at right angles to the opening of said throat, a resilient roller rotatably mounted adjacent to said throat and carrying a plurality of resilient webs adapted when said member is rotated to hold the end of a vegetable extending through said throat in engagement with a surface over which said tool is propelled thereby urging said vegetable through said throat whereby the vegetable may be sliced by said knives, said throat and said resilient member being fixed in cooperative relationship in said frame.

KUNO W. MESTERTON.